Feb. 25, 1969  D. OPEL ET AL  3,429,340
SOLENOID OPERATED VALVE WITH MANUAL OVERRIDE
Filed April 26, 1967
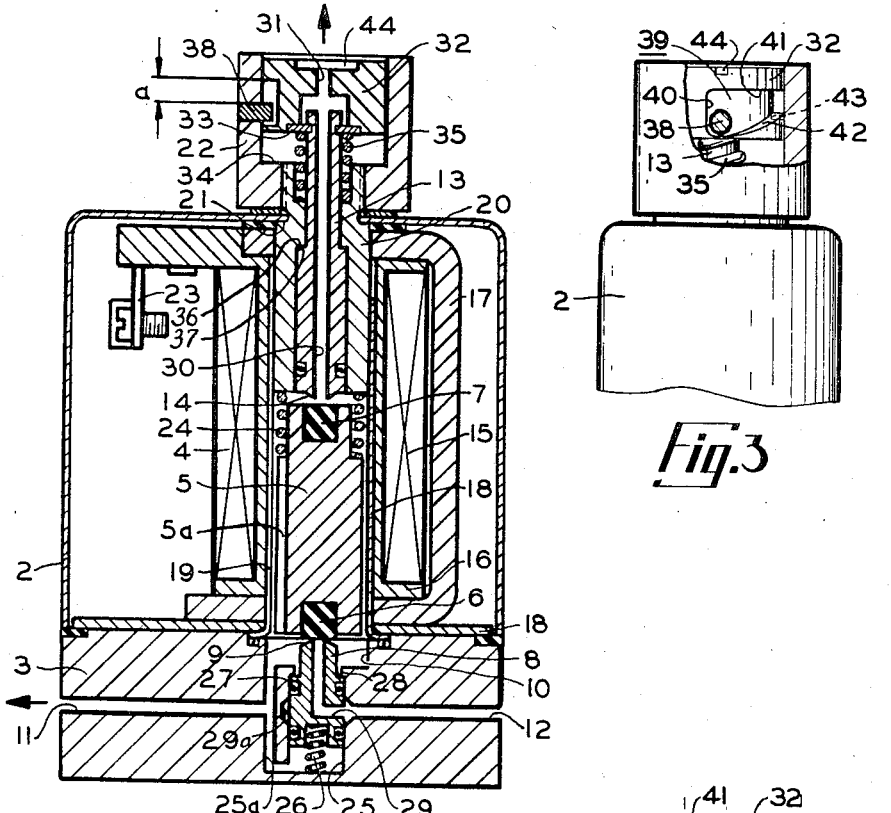
Fig.1
Fig.3
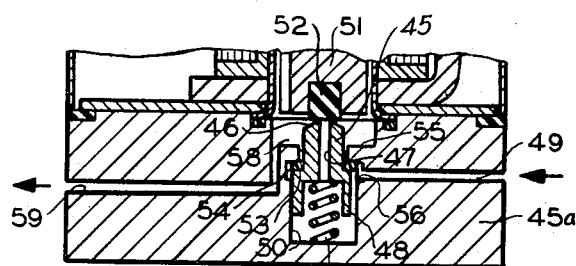
Fig.2
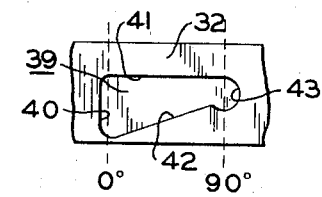
Fig.4
INVENTORS
DETLEF OPEL
KARL-HEINZ BRINKMANN
HERMANN KOSMALSKI
BY Ralph W. McIntosh, Jr.
ATTORNEY

# United States Patent Office 3,429,340
Patented Feb. 25, 1969

3,429,340
SOLENOID OPERATED VALVE WITH
MANUAL OVERRIDE
Detlef Opel, Gehrden, and Karl-Heinz Brinkmann and
Hermann Kosmalski, Hannover, Germany, assignors to
Westinghouse Bremsen- und Apparatebau G.m.b.H.,
Hannover, Germany
Filed Apr. 26, 1967, Ser. No. 633,791
Claims priority, application Germany, May 7, 1966,
W 37,274
U.S. Cl. 137—625.65          6 Claims
Int. Cl. F16k 31/10

ABSTRACT OF THE DISCLOSURE

A solenoid operated valve with manual override in which, a solenoid operated plunger operates from a normal position against a bias in one direction to unseat a main supply valve and close an exhaust valve, the exhaust valve being carried by an operator which when manually operated closes the exhaust valve and operates the plunger in the opposite direction from normal position to close the main supply valve and unseat an auxiliary supply valve member which carries the main supply valve thereon.

---

Heretofore, upon failure of the solenoid in a solenoid operated valve, manual operation of the valve has been effected by means of a rocker arm or a rotating lever for moving the solenoid plunger against a spring bias to thereby operate the valve, which arm or lever projects at a right angle to the plunger and extends laterally through the valve housing. Inasmuch as valves of this type are usually installed in groups upon a bracket, the laterally protruding rocker arms or levers limit the number of valves which can be disposed upon the bracket.

It is an object of this invention to provide in a solenoid actuated valve a vertically protruding manual override mechanism thereby minimizing the lateral dimension of the valve to provide a larger and more compact grouping of a plurality of valves on a given bracket.

This object is achieved in the present invention by disposing a main supply valve and an exhaust valve coaxially with and on opposite ends of a solenoid plunger. The main supply valve end of the plunger communicates with a chamber, which in turn communicates with a delivery passage. A spring normally urges the plunger in a first direction to discharge or exhaust the delivery passage and chamber by seating the supply valve on a supply valve seat disposed in the chamber and simultaneously unseating the exhaust valve relative to an exhaust valve seat which communicates with the chamber via a fluid passage through the plunger. Upon energization of the solenoid winding surrounding the plunger, the plunger is moved axially in the opposite direction to charge the chamber and the delivery passage by unseating the supply valve relative to the supply valve seat and simultaneously seating the exhaust valve on the exhaust valve seat. The manually operative mechanism for effecting charging of the chamber and delivery passage when the solenoid is inoperative comprises an axially movable member slidably received in the solenoid core, which member extends through the cover of the housing and is normally spring biased to a limit position away from said plunger, said member carrying said exhaust valve seat. The main supply valve seat is carried on the end of an auxiliary valve member normally spring biased to a limit position toward the corresponding main supply valve end of the plunger. When the member carrying the exhaust valve seat is urged via a manual depression against its spring bias into engagement with the exhaust valve on the plunger, since the main supply valve on the plunger is already seated on the supply valve seat, further manual depression of the member carrying the exhaust valve seat depresses the auxiliary supply valve member which unseats to supply fluid under pressure to the chamber and the delivery passage in by-pass of said main supply valve so long as the member carrying the exhaust valve seat is held depressed either by continued digital pressure or by operation of lock means actuated by turning the manually operative member about its axis substantially 90 degrees.

FIG. 1 is a cross-sectional view of a solenoid actuated valve with manual override showing our invention;

FIG. 2 is a cross-sectional view of a segment of a solenoid operated valve similar to that of FIG. 1, showing a modified auxiliary supply valve member disposed in a modified housing;

FIG. 3 is a side elevational view of an upper segment of the solenoid operated valve of FIG. 1, shown partially in cross-section, showing the manual override locking mechanism; and FIG. 4 is a development view of a portion of the exterior of the manually operative member of FIGS. 1 and 3.

Referring now to the drawing, there is shown in FIG. 1 a solenoid operated valve device generaly indicated at 1 comprising a housing having a cover 2 attached to a base 3 in any suitable manner, a solenoid 4 mounted on the base inside the cover and having a plunger 5 carrying a main supply valve 6 on one end thereof and an exhaust valve 7 on the other end thereof, an auxiliary supply valve member 8 slidably mounted in said base for movement coaxially with the plunger and carrying a main supply valve seat 9 on one end thereof, a chamber 10 in the base for receiving the main supply valve end of the plunger and also the main supply valve seat end of the auxiliary supply valve member, a delivery passage 11 in the base directly communicating with the chamber, a supply passage 12 in the base communicating with the chamber via the auxiliary valve body, and, a manually responsive valve operator 13 protruding upwardly through the cover and slidably disposed in the solenoid core to carry the exhaust valve seat 14 into engagement with and effect movement of the plunger into the chamber to unseat the auxiliary valve body.

The solenoid 4 comprises a series of windings 15 wound on a spool 16 tightly disposed lengthwise between the legs of a U-shaped mounting bracket 17, one leg of which is disposed on a plate 18 resting atop the surface of the base 3. The bracket and spool are positioned on the base by way of a tubular member 19 sleeved in the lower end of the spool bore and having a flared lower end disposed under the plate 18 in a counterbore of a main bore hereinbefore identified as chamber 10, the chamber being coaxially aligned with the spool bore for receiving therein the lower end of aforementioned plunger 5 as hereinafter described. The lower end of a core member 20 is fixed in the upper portion of tubular member 18 by way of a shoulder 21 therein engaging the underside of cover 2 in cooperation with a nut member 22 threadedly received on that portion of the core which extends through and above the cover 2. A pair of terminals 23 (only one shown) are provided for energizing the windings 15 from a suitable electrical source, not shown.

The main supply valve 6 and the exhaust valve 7 disposed on opposite ends of the plunger 5 comprise inserts of any suitable material for sealing engagement with the corresponding valve seats 9 and 14. A spring 24 compressed between the lower end of the core and the upper end of the plunger normally biases the plunger in a downward direction to an intermediate axial position in engagement with the aforementioned auxiliary valve body member 8 to seat supply valve 6 on supply valve seat 9.

The auxiliary supply valve member 8 is disposed in a bore 25 for movement coaxially with the plunger 5, as shown, with a shoulder 27 thereon comprising the auxiliary supply valve normally seated on the auxiliary supply valve seat 28 comprising an inwardly extending shoulder 28 formed by a necked portion on bore 25. An auxiliary supply valve seating spring 26 disposed in bore 25 is of greater strength than the plunger return spring 24 so that upon deenergization of the windings 15, the valve member 8 remains in the upper limit position, as shown, with the main supply valve 6 seated on the main supply valve seat 9, and with the auxiliary supply valve 27 also seated. A supply passage 29 disposed within the valve member 8 opens at one end between a pair of O-rings axially spaced on the periphery of the valve member in lateral registry with the aforementioned supply passage 12, and opens at the other end to the main supply valve seat 9 to supply fluid under pressure to chamber 10 when the main supply valve 6 is unseated in response to electrical energization of windings 15. An annular recess 29a in bore 25 laterally communicates with supply passage 12 in the base 3 so that upon depression of auxiliary supply valve member 8 in bore 25 from the intermediate position shown to a lower position in chamber 10 in response to manual operation of manual operator 13, in a manner hereinafter described, auxiliary supply valve member 27 is unseated and lowered in bore 25 disposing the upper O-ring seal below recess 29a whereupon pressure from supply passage 12 enters delivery passage 11 via recess 29a, passing around valve 27 to chamber 10 and delivery passage 11. The lower end of bore 25 communicates via an auxiliary passage 25a with delivery passage 11 to provide for pressure balancing of the valve member 8.

The manual override operator 13 is disposed in core 20 for movement coaxially with the plunger 5 for effecting seating engagement of the exhaust valve seat 14 carried thereby with exhaust valve 7 carried by the plunger 5. An exhaust passage 30 disposed axially through the manual operator 13 opens at its lower end at the exhaust valve seat, and opens at its upper end to a through passage 31 in a head member 32 carried on the operator by a snap ring 33 disposed in a peripheral notch on the operator. The head member 32 is disposed for axial reciprocal movement in a bottom bore 34 in the aforementioned nut member 22. A spring 35 compressed between the core 20 and the snap ring 33 normally urges the operator 13 to the upper limit position, as shown, in which a pair of cooperating shoulders 36, 37 on the core and operator, respectively, define the upper limit of movement of the operator. In the upper position of the operator shown in FIG. 1, the lower end of the head 32 is disposed above the bottom of the bottom bore 34 a predetermined distance sufficient to provide for manual depression of the head 32 to lower exhaust valve seat 14 into engagement with exhaust valve 7, and to provide for further depression of head 32 to cause plunger 5 to depress auxiliary supply valve member 8 for unseating auxiliary supply valve 27.

In order to provide for locking the manual operator 13 in the override position, a pin 38 is disposed in nut member 22 extending into bore 34 and into a slot 39 disposed on the exterior of head member 32. Referring to FIGS. 1, 3 and 4, it will be seen that the slot 39 is generally in the form of a right-angled triangle, a first leg 40 of which is disposed vertically to provide for vertical movement a of head 32 to effect unseating of auxiliary supply valve 27, a second leg 41 which extends horizontally substantially ninety degrees around the periphery of head 32 to provide for rotation of head 32 about its axis, and a hypotenuse 42 which is canted relative to the axis of head 23 acting as a cam member to depress head 32 when the head is rotated if the head is not already in a depressed condition. A catch 43, comprising an offset substantially circular depression having a diameter slightly larger than the diameter of pin 38, is disposed at the intersection of the hypotenuse 42 with the second leg 41, thereby locking the head 32 in the fully depressed position when pin 38 is engaged therein. A transverse slot 44 is disposed in the upper surface of head 32, in intersecting relationship with the exhaust passage 31, for receiving therein the edge of a coin or the end of a screwdriver to effect depression and/or rotation of head 32.

In describing the operation of the device, it will be assumed that the solenoid windings 15 are deenergized and that the manual operator is in the inoperative position. Under these conditions the various elements assume the positions shown in FIG. 1, that is, operator 13 and head 32 are disposed in the upper limit position under the urging of spring 35, plunger 5 is disposed in the intermediate position in which exhaust valve 7 is unseated relative to seat 24 and supply valve 6 is seated relative to seat 9 under the urging of spring 24, and auxiliary supply valve member 8 is disposed in the upper limit position under the urging of spring 26 thereby seating auxiliary supply valve 27 relative to seat 28. Under these conditions, fluid under pressure in supply passage 12 and passage 29 in valve member 8 is prevented from entering pressure chamber 10, and delivery passage 11 is vented to atmosphere via chamber 10, passage 5a in plunger 5 and exhaust passages 30 and 31.

Upon energization of windings 15, plunger 5 is raised against spring 24 to seat exhaust valve 7, thereby closing off chamber 10 from atmosphere and simultaneously unseating supply valve 6 whereupon delivery passage 11 is pressurized via supply passage 12, passage 29 in auxiliary valve member 8 and chamber 10.

Upon deenergization of windings 15, plunger 5 reassumes the initially described position, as shown in FIG. 1.

If now it is desired to effect supply of pressurized fluid to delivery passage 11 via manual force in lieu of energization of the windings 15, head 32 is manually depressed distance a whereupon operator 13 is depressed a first increment of a to engage exhaust valve seat 14 with exhaust valve 7, thus closing off chamber 10 from atmosphere, and whereupon further depression of head 32 the full distance a lowers plunger 5 from the intermediate position shown in FIG. 1 to depress auxiliary valve member 8 against spring 26 to the lower position in which auxiliary valve 27 is unseated and disposed adjacent annular groove 29a, thus admitting fluid under pressure from supply passage 12, through annular groove 29a around valve 27 and through the upper end of bore 25 to chamber 10 and delivery passage 11. Upon release of manual force on head 32, operator 13 reassumes the position shown in FIG. 1 under the urging of spring 35 to unseat exhaust valve 7 venting chamber 10 to atmosphere, and valve member 8 reassumes the position shown, seating the auxiliary supply valve and positioning plunger 5 in the intermediate position shown.

If it is desired to lock the device in the manual supply position, the head 32 is rotated to the ninety degree position either after depression through distance a, or before depression, in which latter event side 42 of the slot cams the head downwardly through distance a. Obviously, reverse rotation of head 32 after a locking operation will release the pin 38 from catch 43 thereby effecting a return of the elements to the positions shown in FIG. 1 and described above.

Referring now to FIG. 2 of the drawing, there is shown a modification of the invention in which a modified auxiliary supply valve body 45 is disposed in a modified base 45a. In this construction, the upper end of the valve body comprises a main supply valve seat 46 similar to the construction of FIG. 1. However, the supply passage 47 in the auxiliary supply valve member extends axially therethrough in communication with a bottom bore 48 in the lower end of the valve member, which bottom bore serves as a supply passage for receiving fluid under pressure from main supply passage 49 in the base 45a via the bore 50 in which the valve member is disposed for reciprocal movement. The plunger 51 carries a main supply valve 52 disposed on the lower end thereof. The upper end of valve member 45 is of smaller diameter than the lower end thereof, forming a shoulder 53 upon which is disposed an annular auxiliary supply valve member 54 normally seated on an auxiliary supply valve seat 55 comprising a shoulder integral with the base 45a and extending radially inwardly of the bore 50. An annular recess 56 in the bore 50 laterally opens to supply passage 49 so that upon depression of valve member 45 against the bias of a spring 57, fluid under pressure from supply passage 49 passes through recess 56 and around auxiliary supply valve 54 to pressure chamber 58 and delivery passage 59. The diameter of the lower end of valve member 45 is smaller than that of bore 50 so that upon unseating of main supply valve 52 in response to energization of the solenoid, fluid under pressure from supply passage 49 is supplied to delivery passage 59 via the lower end of bore 50 to bottom bore 48, passage 47 and pressure chamber 58. By this construction, the supply pressure on the lower end of auxiliary supply valve member 54 serves to pressure balance the valve member relative to supply pressure in chamber 58.

Having now described the invention, what we claim as new and desire to secure by Letters Patent is:

1. A solenoid operated valve having a manual override, comprising:
  (a) a solenoid having an axially movable plunger,
  (b) a main supply valve disposed on one end of said plunger,
  (c) an exhaust valve disposed on the other end of said plunger,
  (d) said plunger being disposed between and in coaxial relationship with an exhaust valve seat and a main supply valve seat for axial movement in a first direction to a first axial limit position to seat said exhaust valve on said exhaust valve seat and unseat said main supply valve from said main supply valve seat in response to energization of said solenoid,
  (e) means biasing said plunger in the opposite axial direction to an intermediate axial position to unseat said exhaust valve from said exhaust valve seat and to seat said main supply valve on said main supply valve seat when said solenoid is deenergized,
  (f) said main supply valve seat being carried by an auxiliary supply valve member disposed for movement coaxially with said plunger,
  (g) means biasing said auxiliary supply valve member in said first direction in seating engagement with an auxiliary supply valve seat with a force in opposition to and greater than that of said plunger biasing means to normally hold said plunger in said intermediate position,
  (h) means providing a main supply passage communicating with a delivery passage when said main supply valve is unseated or when said auxiliary supply valve is unseated,
  (i) said exhaust valve seat being carried by a manual operator having an exhaust passage therein communicating with atmosphere at one end and communicating with said exhaust valve seat at the other end,
  (j) said manual operator being biased to a limit position in said first direction and being operable in response to axial movement thereof in said opposite direction to seat said exhaust valve seat on said exhaust valve and upon further movement thereof in said opposite direction to cause movement of said plunger in said opposite direction from said intermediate position to a second axial limit position to unseat said auxiliary supply valve.

2. The solenoid operated valve with manual override as recited in claim 1, in which said means providing a supply passage communicating with a delivery passage comprises a base member supporting said solenoid thereon and having a pressure chamber therein for receiving said one end of said plunger when said plunger is disposed in said second limit position, said auxiliary valve member is slidably disposed in a bore in said base coaxially aligned with said plunger and open to said chamber, said supply passage communicating with said bore, said delivery passage communicating with said chamber, and a passage in said auxiliary supply valve member communicating said main supply valve seat with said supply passage via said bore when said auxiliary supply valve is seated.

3. The solenoid operated valve with manual override as recited in claim 2, in which said auxiliary supply valve comprises a body having a necked portion axially extending in said first direction, the end of said axial extension comprising said main supply valve seat, an annular shoulder formed at the intersection between said body and said axial extension and forming said auxiliary supply valve, and said bore having a radially inwardly extending portion comprising said auxiliary supply valve seat.

4. The solenoid operated valve with manual override as recited in claim 3, in which said supply passage in said auxiliary valve member opens laterally of said valve body in communication with said bore and in registry with said supply passage in said base when said auxiliary supply valve is seated on said auxiliary supply valve seat, and an auxiliary passage in said base communicating said delivery passage with the bottom of said bore.

5. The solenoid operated valve with manual override as recited in claim 3, in which said passage in said auxiliary valve member comprises an axial throughbore and in which said valve body has a maximum diameter smaller than that of said bore to provide a fluid passage from said supply passage in said base between the valve body and the bore to said through passage in said valve body.

6. The solenoid operated valve with manual override as recited in claim 1, in which means are provided to releasably lock said manual operator in position to hold said plunger in said second limit position.

References Cited
UNITED STATES PATENTS 3,269,417    8/1966    Lansky et al. _____ 137—625.64

HENRY T. KLINKSIEK, *Primary Examiner.*

U.S. Cl. X.R.

252—130